United States Patent [19]

Monroe

[11] 3,733,822
[45] May 22, 1973

[54] DUAL RATIO FORCE TRANSFER APPARATUS

[75] Inventor: William E. Monroe, Oak Park, Mich.

[73] Assignee: The Bendix Corporation, South Bend, Ind.

[22] Filed: Aug. 11, 1971

[21] Appl. No.: 170,903

[52] U.S. Cl..................60/54.5 R, 60/54.6 P, 91/391
[51] Int. Cl............................F15b 7/00, F15b 13/10
[58] Field of Search............................91/391 A, 391; 74/516, 518; 60/54.5 P, 54.6 P, 54.5 R

[56] References Cited

UNITED STATES PATENTS 3,110,031    11/1963    Price.................................60/54.5 P

FOREIGN PATENTS OR APPLICATIONS 849,395    9/1960    Great Britain....................60/54.6 P Primary Examiner—Martin P. Schwadron
Assistant Examiner—A. M. Zupcic
Attorney—Leo H. McCormick, Jr.

[57] ABSTRACT

An apparatus for transforming an input force to an operational force to activate a pressure controlled power device. In a first mode of operation the input force is directly communicated through a confined deformable medium to an output member. Upon a predetermined operational force being required, the confined deformable medium changes its characteristics from a solid-like body to a liquid-like body for a second mode of operation. In the second mode of operation the input force is converted to an operational force which is the product of the pressure in the liquid-like body acting over the contacting area of the output member.

11 Claims, 3 Drawing Figures

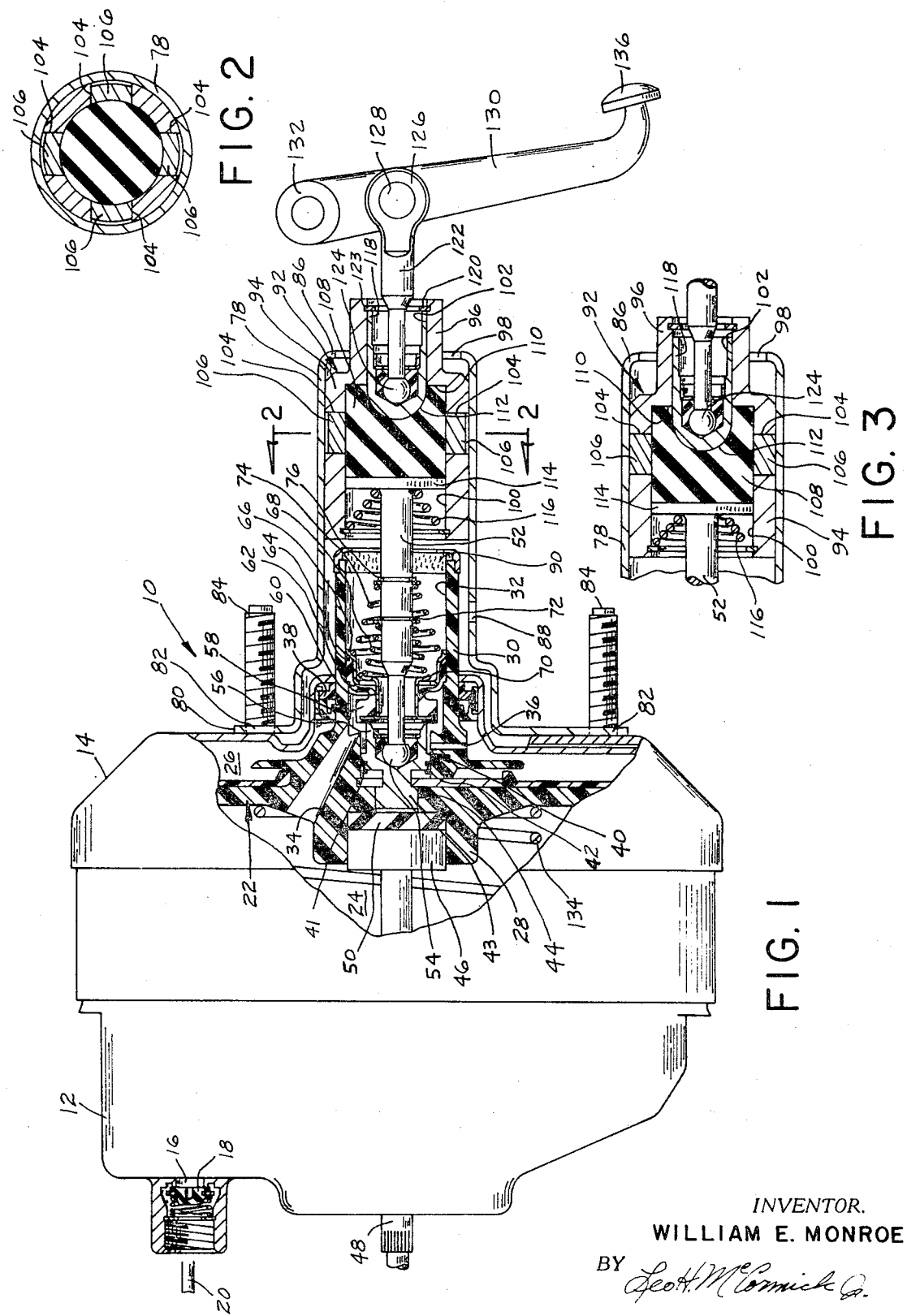

DUAL RATIO FORCE TRANSFER APPARATUS

BACKGROUND OF THE INVENTION

In modern vehicles equipped with servomotor operated braking systems, the input force to operate the servomotor is very slight with the engine running since the function of the input force is to operate a control valve. This cntrol valve regulates the operational fluid power supply communicated to the servomotor to create a pressure differential across a movable wall in the servomotor. This pressure differential provides the operational output force needed to energize a master cylinder which pressurizes the operational fluid in the braking system.

However, if the operational fluid is reduced or terminated as when the engine is stopped, the operator must manually supply the output force needed to energize the master cylinder.

In order to increase the effectiveness of the input force when fluid power is unavailable, various devices, such as those termed "pop-up pedal" devices, have been made available. In most of these devices, the location through which the input force is transmitted is shifted to provide a pedal with a different leverage transmission point. Examples of these devices can be seen in U.S. Pat. No. 3,142,199 where toggle linkage changes the leverage point, U.S. Pat. No. 3,275,891 where vacuum controlled levers change the point of application, and by a positioning slot on the pedal arm as shown in U.S. Pat. No. 3,063,427. In addition to the numerous parts that are needed to bring the pedal into the different position, if power is lost when the vehicle is moving, the pedal pops up and it takes the operator some time to adjust to this new pedal height.

Later, as disclosed in copending U.S. application Ser. No. 23,533 filed Mar. 30, 1970 and incorporated by reference, a dual lever ratio input force was developed to maintain the pedal in the same physical height at all times, with and without power. In this device a first force transmitting member is separated by a gap from the valve operating the servomotor until the force required to operate the servomotor, which force is transmitted through a first resilient member of a second force transmitting member, is sufficient to compress the resilient member and close the gap. With the gap closed, further input is then transmitted through the first force transmitting member. However, during the period of time it takes to close the gap, the operator experiences a feeling that the input force is failing to properly operate the valve rod which supplies an input to the servomotor.

In copending U.S. application Ser. No. 147,494, filed May 27, 1971, which is an improvement of U.S. application Ser. No. 23,533 and incorporated by reference, a second resilient member corporating with the second force transmitting member moves a wedge of the first force transmitting member into engagement as the first resilient member is correspondingly compressed. The frictional engagement permits an additive output force to be immediately developed between the inputs supplied to the first and second force transmitting member.

However, in the above incorporated copending U.S. application it is necessary to have a plurality of input push rods transmitting the necessary operating force to a single valve control rod. With several forces acting on a single valve control rod it is possible that a binding in the operation of the valve control rod could occur due to the opposite movements from the different inputs.

SUMMARY OF THE INVENTION

In my invention I have devised an apparatus with means to convert a single input force into a multi-ratio output force in response to an operational force needed by a pressure controlled power device.

In my apparatus a deformable confined medium separates an input member from the output member. Initially, the confined medium acts as a solid-like body and directly carries the input force to the output member. When a predetermined operational force develops, the opposition between the operational force and the input force transforms the characteristics of the confined medium from a solid-like body to a liquid-like body. Further force from the input member is directed into the liquid-like body to create a fluid pressure. This fluid pressure acting on an area of the output will create the operational force needed to activate the pressure controlled power device.

It is therefor the object of this invention to provide a means for transforming an input force to an output force in proportion to the operational force needed to operate a power device.

It is another object of this invention to provide dual force transmitting means between an axial aligned input member and output member.

It is a further object of this invention to provide a confined means which initially acts as a solid body to directly transfer an input force to an output member until a compressive force transforms the characteristics of the confined means to those of a fluid body which transfers any further input force to the output member as a product of a created fluid pressure acting on the contacting area of the output member.

These and other objects will be apparent to those who read this specification and view this drawing.

BRIEF DESCRIPTION OF THE DRAWINGS

FIG. 1 is a sectional view of a servomotor for operating a power braking system with a dual ratio force transfer apparatus constructed in accordance with the principles of my invention in the rest position;

FIG. 2 is a sectional view taken along line 2—2 of FIG. 1; and

FIG. 3 is a sectional view of the dual ratio force transfer apparatus of FIG. 1 in an applied position.

DETAILED DESCRIPTION OF THE PREFERRED EMBODIMENT

In the drawing shown in FIG. 1, a servomotor 10 having a front shell 12 is fixed to a rear shell 14. The front shell 12 has an opening 16 wherein a check valve 18 is secured. Check valve 18 is connected to a source of partial vacuum, usually the intake manifold (not shown) of a vehicle, by conduit 20. Wall means 22 divides the interior of the servomotor 10 into a front chamber 24 and a rear chamber 26. Wall means 22 has a hub 28 with a projection 30, which extends through a sealed opening 38 to the rear shell 14. Hub 28 has a stepped interior bore 32 with a first passage 34 connected to the front chamber 24 and a second passage 36 connected to the rear chamber 26. Plunger means 40 having a guide surface 42 of a type disclosed in U.S. application Ser. No. 150,326 and incorporated herein by reference is placed in a small diameter section 44 of the stepped interior bore of the hub 28. Bumper 41 attached to the plunger means 40 will deaden any noise created in the hub 28 and reduce the possibility of sound being carried to the plunger means 40. A cylindrical head 46 on output push rod 48 is placed in the bore 32 of hub 28 adjacent the small diameter section 44. A reaction disc 50 of the type disclosed in U.S. Pat. No. 3,110,031 and incorporated herein by reference is located between the cylindrical head 46 and the cylindrical surface 43 on the plunger means 40.

A valve control rod 52 has a spherical end 54 attached to the plunger means 40 in a manner fully described in copending U.S. application Ser. No. 128,754 filed Mar. 29, 1971 and incorporated herein by reference. A rearwardly facing annular atmospheric valve seat 56 on plunger means 40 surrounds the control rod 52 to provide a seat for an annular rubber poppet member 58. The annular rubber poppet member 58 surrounds a support tube 60 which transmits an actuation force to seat the poppet member 58 on the valve seat 56. The poppet member 58 has an integral flexible diaphragm portion 62 with a radial outer periphery 64 which is enlarged and held against the stepped bore 32 by retainer ring 66. The annular poppet member 58 is biased against the atmospheric valve seat 56 by a coil spring 68 which acts on flange 70 of the support tube 60 and a first snap ring 72 positioned on the valve control rod 52. The valve control rod 52 is retained in the rest position as shown in FIG. 1 by a return spring 74 positioned between the retainer ring 66 and a second snap ring 76 located on the valve control rod 52.

A tubular housing 78 has an outward flange 80 on the front end with a plurality of holes 82 which match the mounting studs 84 on the rear shell 14 and an inward flange 86 on its rear end. A plurality of openings 88, only one being shown, located in a semi-circle around the lower portion of the tubular housing 78 adjacent the front end will permit atmospheric pressure a free passing through filter 90 into stepped bore 32. In addition, if any condensation should develop in the interior of the tubular housing 78 openings 88 will provide a passage to the atmosphere.

A first piston means 92 located in the tubular housing 78 has a first section 94 whose diameter is substantially equal to the inner diameter of the tubular housing 78 and a second section 96 of a smaller diameter than the first section 94. The second section 96 passes through axial opening 98 formed by the inner periphery of flange 86. A first bore 100 located in the first section 94 is connected to a corresponding second smaller bore 102 in the second section. A plurality of radial slots or openings 104 are located in the first section 94 and a corresponding number of pad means 106 are located in the slots 104. The pad means 106 can be constructed of any material such as brass, ceramic metals, structural carbon, sintered iron or any other material which exhibits a predetermined frictional coefficient with the material in the tubular housing 78.

A pressure deformable medium 108, such as an elastomer, liquid-filled bag or any other material which will initially have solid-like characteristics, but will subsequently assume liquid-like characteristics upon the exertion of a predetermined compressive force thereagainst, is placed adjacent shoulder 110 in the first bore 100 of the first piston means 92. The deformable medium 108 has a hemispherical section 112 in axial alignment with the spherical end 54 of the valve control rod 52 and the second bore 102. A cylindrical head 114 on the end of push rod 52 is located in and has a diameter substantially equal to that of the first bore 100. A resilient means 116 attached to the first section 94 of the first piston means 92 urges the cylindrical head 114 against the deformable medium 108.

A second piston means 118 is slidably located in the second bore 102. The second piston means is pushed into the hemispherical section 112 of the deformable medium and snap ring 120 positioned in groove 123 of the second portion 96 of the first piston means. The second piston means 118 is connected to the spherical end 124 of push rod 122 in a manner similar to the connection of the spherical end 54 and plunger means 40. An eye 126 is pivotable on pin 128 which is attached to lever arm 130. The lever arm 130 is pivotally retained on pin 132 fixed to the housing of a vehicle.

MODE OF OPERATION OF THE PREFERRED EMBODIMENT

In vehicles equipped with vacuum powered brakes it is essential that the engine be running and producing a partial vacuum at the intake manifold. This partial vacuum is communicated through conduit 20 to the front chamber 24 of the servomotor 10. From the front chamber 24 this partial vacuum is communicated through passage 34 into the interior of the stepped bore 32 around the seated plunger means 40 and out passage 36 to the rear chamber 26. With partial vacuum in both the front chamber 24 and rear chamber 26, return spring 134 maintains the hub means 22 in the rest position as shown in FIG. 1.

When an operator desires to bring the vehicle to a stop, a force is applied to the pedal 136. This force causes the lever arm 130 to pivot about pin 132 and transmits to push rod 122 an input force which is the product of the pedal force and the location of the eye 126 of the push rod 122 with respect to the pedal 136 and the pivot pin 132. This input force is transferred through spherical end 124 to the second piston means 118. From piston means 118 the force is transferred through the deformable confined medium 108 to the cylindrical head 114 of push rod 52. This input force will cause push rod 52 to move and slide the plunger means 40 away from the annular rubber poppet 58 to permit the closing of the partial vacuum connection with the rear chamber 26 and to allow the opening of the atmospheric pressure connection through bore 32 to the rear chamber 26. With atmospheric pressure in the rear chamber 26 and partial vacuum in the front chamber 24, a pressure differential will be created across wall means 22. This pressure differential acting on the area of the wall means 22 will create a force which will cause the wall means 22 to move and deliver an output force to push rod 48 for energizing the master cylinder (not shown) which pressurizes the operational fluid in the power braking system.

As the push rod 52 moves along, resilient means 116 will correspondingly move the first piston means 92 in the tubular housing 78, as shown in FIG. 3. The amount of force required to energize the master cylinder will be carried back through push rod 52 as a reaction force. This reaction force and the input force will combine to develop a compressive force on the confined pressure deformable medium 108. When a sufficient compressive force is developed, the characteristics of the deformable medium 108 will be transformed from a solid-like body to a liquid-like body. Continued input pressure exerted through spherical end 124 of push rod 122 will cause the second piston means 118 to slide in bore 102 thereby in effect causing a fluid pressure to be created in the liquid-like body. This fluid pressure will move the pad means 106 into frictional engagement with the interior of the tubular housing 78 to prevent the first piston means 92 from moving. The same fluid pressure will also be applied to the surface area of the cylindrical head 114 in contact with the deformable medium 108 to create an operational pressure which is the product of the fluid pressure and surface area of the cylindrical head 114. Thus, the operational force supplied to the push rod 52 will be changed from that directly received through the deformable medium 108 acting as a solid body to an increased operational force created by the deformable medium acting as a liquid body, which is the product of a developed fluid pressure and the area of the head 114 of the output push rod 52.

I claim:

1. A dual ratio force transfer device, comprising:
   a housing having a bore therein;
   sleeve means located in said bore having a plurality of radial openings;
   pad means located in said radial openings;
   deformable means located in said sleeve means;
   output means located in said sleeve means having an area in contact with said deformable means for transferring an operational force to another mechanism; and
   input means having an area in contact with said deformable means for communicating an actuation force through said deformable means to cause said output means to move and create said operational force, said deformable means initially acting as a rigid body which transfers said actuation force from said input means directly to said output means until a predetermined resistive force transforms the characteristics of said deformable means to that of a liquid-like body, said actuation force then being transmitted through said area in contact with said liquid-like body to develop a fluid pressure in the liquid-like body, said fluid pressure moving said pad means into contact with said housing to frictionally prevent said sleeve means from moving and allow said actuation force to be applied to said output means as a product of said fluid pressure and the area of said output means in contact with said liquid-like body.

2. The dual ratio force transfer device, as recited in claim 1, wherein said sleeve means includes:
   a first section having a first central bore, said first section containing said radial openings; and
   a second section having a second central bore connected to and of a smaller diameter than said first central bore, said second section extending through an opening in said housing for guiding said input means into contact with said deformable means retained in said first section, said second section having a smaller peripheral circumference than said first section, said first section being retained in said housing upon abutting the portion of the housing surrounding said opening.

3. The dual ratio force transfer device, as recited in claim 2, wherein said input means includes:
   a piston having a cylindrical body with a first face projecting into said deformable means, said piston being located in said second central bore; and
   first keeper means secured to said second section for retaining said piston in said second central bore.

4. The dual ratio force transfer device, as recited in claim 3, wherein said input means further includes:
   a first push rod having a sphere on one end and an eye on the other end, said sphere being connected to said piston;
   a lever arm pivotally retained on a support; and
   a pin extending through said eye for joining said push rod to said lever arm;
   said lever arm moving in response to an operator to transfer said actuation force to said first push rod causing said piston to slide in said second central bore and communicate said first force to said deformable means.

5. The dual ratio force transfer device, as recited in claim 4, wherein said output means includes:
   a second push rod having a secnd face retained in and with a diameter equal to the first central bore;
   a second keeper means secured to said first section for retaining said second face in said first bore; and
   resilient means for urging said second face against said deformable means, said resilient means moving said sleeve means in said bore of the housing until said pad means becomes engaged with the housing.

6. The dual ratio force transfer device, as recited in claim 5, wherein said housing includes a slot which extends through said bore, said slot permitting air at atmospheric pressure to enter said bore and exert a balancing pressure across said sleeve means, said slot further permitting any condensation of liquid in the bore a free passage to the atmosphere without damage to the deformable means.

7. A pressure ratio power transfer apparatus, comprising:
   a tubular housing having a plurality of passages adjacent one end and retaining means on the other end, said retaining means having an axial opening;
   first piston means having a first portion located in the tubular housing and a second portion extending through said axial opening, said first piston means having a plurality of slots in the first portion, said first piston means having a larger bore in said first portion connected to a smaller bore in said second portion;
   pad means located in said plurality of slots;
   output means having a surface area located in and substantially equal to the larger bore of said first piston means for supplying an energizing force to a pressure controlled power device;
   second piston means located in said smaller bore of said first piston means;
   input means connected to said second piston means for communicating an operational force in response to an operator; and
   a confined medium located in said larger bore of said first piston means between the output means and the second piston means, said confined medium during a first operational mode acting as a solid-like body transferring said operational force directly from said input means to correspondingly move said first and second pistons, and said output means until a predetermined force created by the opposition of said energizing force with the operational force transforms said solid-like body into a liquid-like body to initiate a second operational mode, said second piston means moving in said smaller bore during said second mode of operation to develop a fluid pressure in the created liquid-like body, said fluid pressure moving said pad means into contact with the tubular housing to prevent further movement of said first piston means, said fluid pressure being applied to the surface area of the output means in the larger bore to deliver a corresponding energizing force which moves said output means.

8. The pressure ratio power transfer apparatus, as recited in claim 7, wherein said first piston means further includes:

resilient means for biasing said surface area of the output means into contact with said confined medium and for moving said first piston means during said first mode of operation in the tubular housing.

9. The pressure ratio power transfer apparatus, as recited in claim 8, wherein said first piston means further includes:

keeper means located in said small bore for retaining said second piston means in contact with said confined medium.

10. The pressure ratio power transfer apparatus, as recited in claim 9, wherein the plurality of passages in said tubular housing are located in a semi-circle along the lower side of said tubular housing for balancing the pressure on the first piston means by freely admitting atmospheric pressure to the interior of said tubular housing and for draining any condensation concentrated in the tubular housing.

11. A multi-ratio force transfer mechanism comprising:

a housing having a bore therein;

sleeve means located in said bore;

braking means operatively connected to said sleeve means, said braking means having a first force condition for permitting relative movement between said sleeve.

* * * * *

PO-1050
(5/69)

UNITED STATES PATENT OFFICE
CERTIFICATE OF CORRECTION

Patent No. 3,733,822  Dated May 22, 1973

Inventor(s) WILLIAM E. MONROE

It is certified that error appears in the above-identified patent and that said Letters Patent are hereby corrected as shown below:

Column 1, Line 8, delete "cntrol" and insert --control--.
Column 6, Line 21, delete "secnd" (second occurrence) and insert --second--.
Column 8, Line 21, delete "." and insert --means and said housing and a
    second force condition for preventing relative movement there-
    between;
        an elastomeric member confined within said sleeve means;
        output means located in said sleeve means and having a first
    area in contact with said elastomeric member for transferring an
    operational force to a device; and
        input means having a second area in contact with said deform-
    able means for exerting an input force thereagainst;
        said first area being greater than said second area;
        said elastomeric member having the characteristics of a
    solid-like body for directly transferring said input force from
    said input means to move said sleeve with said output means without
    force multiplication until said input force reaches a predetermined
    value at which time said elastomeric member assumes the character-
    istics of a confined liquid-like body capable of moving said
    braking means to said second force condition to provide a moving
    force multiplication between said input and output means alone
    which is a function of the ratio of said first and second areas.--

Signed and sealed this 12th day of November 1974.

(SEAL)
Attest:

McCOY M. GIBSON JR.
Attesting Officer

C. MARSHALL DANN
Commissioner of Patents